United States Patent
Matthews et al.

(10) Patent No.: US 11,392,714 B1
(45) Date of Patent: Jul. 19, 2022

(54) HIERARCHICALLY ENCRYPTED DATA MANAGEMENT SYSTEM

(71) Applicant: Amazon Technologies, Inc., Seattle, WA (US)

(72) Inventors: Nicholas Channing Matthews, Atlanta, GA (US); Scott Bradley Ward, Seattle, WA (US); Joshua R. Hammer, New Hyde Park, NY (US)

(73) Assignee: Amazon Technologies, Inc., Seattle, WA (US)

( * ) Notice: Subject to any disclaimer, the term of this patent is extended or adjusted under 35 U.S.C. 154(b) by 933 days.

(21) Appl. No.: 16/141,840

(22) Filed: Sep. 25, 2018

(51) Int. Cl.
*G06F 21/62* (2013.01)
*H04L 9/08* (2006.01)
*G06F 21/78* (2013.01)

(52) U.S. Cl.
CPC .......... *G06F 21/6227* (2013.01); *G06F 21/78* (2013.01); *H04L 9/083* (2013.01)

(58) Field of Classification Search
CPC .. G06F 21/6218; G06F 21/6227; G06F 21/78; H04L 9/083
See application file for complete search history.

(56) References Cited

U.S. PATENT DOCUMENTS

| | | | |
|---|---|---|---|
| 9,749,132 B1 * | 8/2017 | Hamilton | .............. H04L 9/0894 |
| 9,792,454 B2 | 10/2017 | Rozenberg et al. | |
| 2010/0250958 A1 | 9/2010 | Browning | |
| 2014/0075571 A1 | 3/2014 | Jackson et al. | |
| 2015/0178506 A1 * | 6/2015 | Elovici | ................. H04L 9/0894 |
| | | | 713/189 |
| 2015/0371058 A1 * | 12/2015 | Mattsson | .............. G06F 21/602 |
| | | | 713/189 |
| 2015/0379299 A1 | 12/2015 | Klein et al. | |
| 2016/0210470 A1 | 7/2016 | Rozenberg et al. | |
| 2016/0292221 A1 | 10/2016 | Clarke et al. | |
| 2016/0344707 A1 * | 11/2016 | Philipp | .................... H04L 63/06 |
| 2017/0063811 A1 * | 3/2017 | Hitchcock | ............... G06F 21/10 |
| 2017/0262645 A1 | 9/2017 | Gupta et al. | |

(Continued)

OTHER PUBLICATIONS

Rachel Leist, "An Introductory SQL Tutorial: How to Write Simple Queries", retrieved Sep. 23, 2021 from https://web.archive.org/web/20151127033248/https://blog.hubspot.com/marketing/sql-tutorial-introduction (Mar. 25, 2015) (Year: 2015).*

(Continued)

*Primary Examiner* — Theodore C Parsons
(74) *Attorney, Agent, or Firm* — Davis Wright Tremaine LLP

(57) ABSTRACT

A data storage and retrieval system stores a collection of data in which a first portion is encrypted using a first cryptographic key, and comprises a second portion encrypting using a second cryptographic key. The data storage and retrieval system receives a request to query the collection on behalf of a security principal. The request comprises information indicative of the first and second keys. The system confirms the authorization of the security principal to access at least some of the collection of data, and generates intermediate results which comprise the encrypted first and second portions. The system causes the intermediate results to be decrypted using the first and second key information.

20 Claims, 7 Drawing Sheets

(56) References Cited

U.S. PATENT DOCUMENTS

2018/0012031 A1 1/2018 Block et al.
2019/0220619 A1 7/2019 Loza et al.

OTHER PUBLICATIONS

Extend Office, "How to encrypt/decrypt selected cells in Excel?" Jan. 19, 2016, retrieved Oct. 2, 2020, from http://web.archive.org/web/20160119090054/https://www.extendoffice.com/documents/excel/3435-excel-encrypt-cell-contents.html, 5 pages.

Oracle Help Center, "Database Concepts: 11 Physical Storage Structures," © 1993, retrieved Oct. 2, 2020, from https://docs.oracle.com/cd/E11882_01/server.112/e40540/physical.htm#CNCPT003, 17 pages.

Sabbagh, "Encrypt/Decrypt Sensitive Data in Excel Spreadsheets Using CellShield," Jun. 15, 2017, retrieved Oct. 2, 2020, from http://web.archive.org/web/20170615204730/https://www.iri.com/blog/data-protection/encryptdecrypt-sensitive-data-excel-spreadsheets-cellshield/, 7 pages.

Stack Overflow, "How do databases physically store data on a filesystem?" Aug. 18, 2012, retrieved Oct. 2, 2020, from https://stackoverflow.com/questions/12018565/how-do-databases-physically-store-data-on-a-filesystem, 2 pages.

* cited by examiner

HIERARCHICALLY ENCRYPTED DATA MANAGEMENT SYSTEM

BACKGROUND

Data storage and retrieval systems face a variety of challenges related to providing data security. These challenges include providing fine-grained control over access to stored data, such as the tables, columns, rows, and fields of a relational database. A further challenge involves thwarting malicious actors who might attempt to access stored data through any of a variety of surreptitious means.

BRIEF DESCRIPTION OF THE DRAWINGS

Various techniques will be described with reference to the drawings, in which.

DETAILED DESCRIPTION

Embodiments of the disclosure are directed to data storage and retrieval systems that use hierarchical encryption to control access to stored data. In an example, a data storage and retrieval system stores a collection of data in which a portion of the collection of data is encrypted using a first cryptographic key, and in which that portion comprises a second portion separately encrypted using a second cryptographic key. The data storage and retrieval system may then receive a request to query the collection of data. The request comprises information identifying keys needed to process the query and decrypt the results. The data storage and retrieval system, in response to the query, determines that the security principal is authorized to access at least some of the collection of data, generates results comprising the encrypted portions, and then causes the decryption of the encrypted portions using the keys indicated by the query.

Examples of a data storage and retrieval system include, but are not limited to, relational databases, lightweight directory access protocol servers, object databases, and so on. As described herein, these and other types of data storage and retrieval systems can maintain a hierarchically encrypted collection of data. Encryption refers to encoding data in a manner that prevents unauthorized access. Any of a variety of encryption types, including symmetric and asymmetric (e.g., public-key encryption) can be used in conjunction with the disclosed techniques. As used herein, a cryptographic key, which may also be referred to as a key, refers to a cryptographic key that may be used to perform encryption and/or decryption operations.

Hierarchical encryption refers to encrypting data at successive levels of a hierarchy, such that encrypted data at a lower level of the hierarchy is again encrypted at a higher level of the hierarchy. A hierarchically encrypted collection of data is a collection of data that has been hierarchically encrypted. As an example, a hierarchically encrypted relational database table might contain encrypted data corresponding to the table. This data, in turn, might contain separately encrypted data corresponding to a row. Here, separate encryption refers to the use of a different key to encrypt the data, or to a need to use a different key to decrypt the separately encrypted data.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
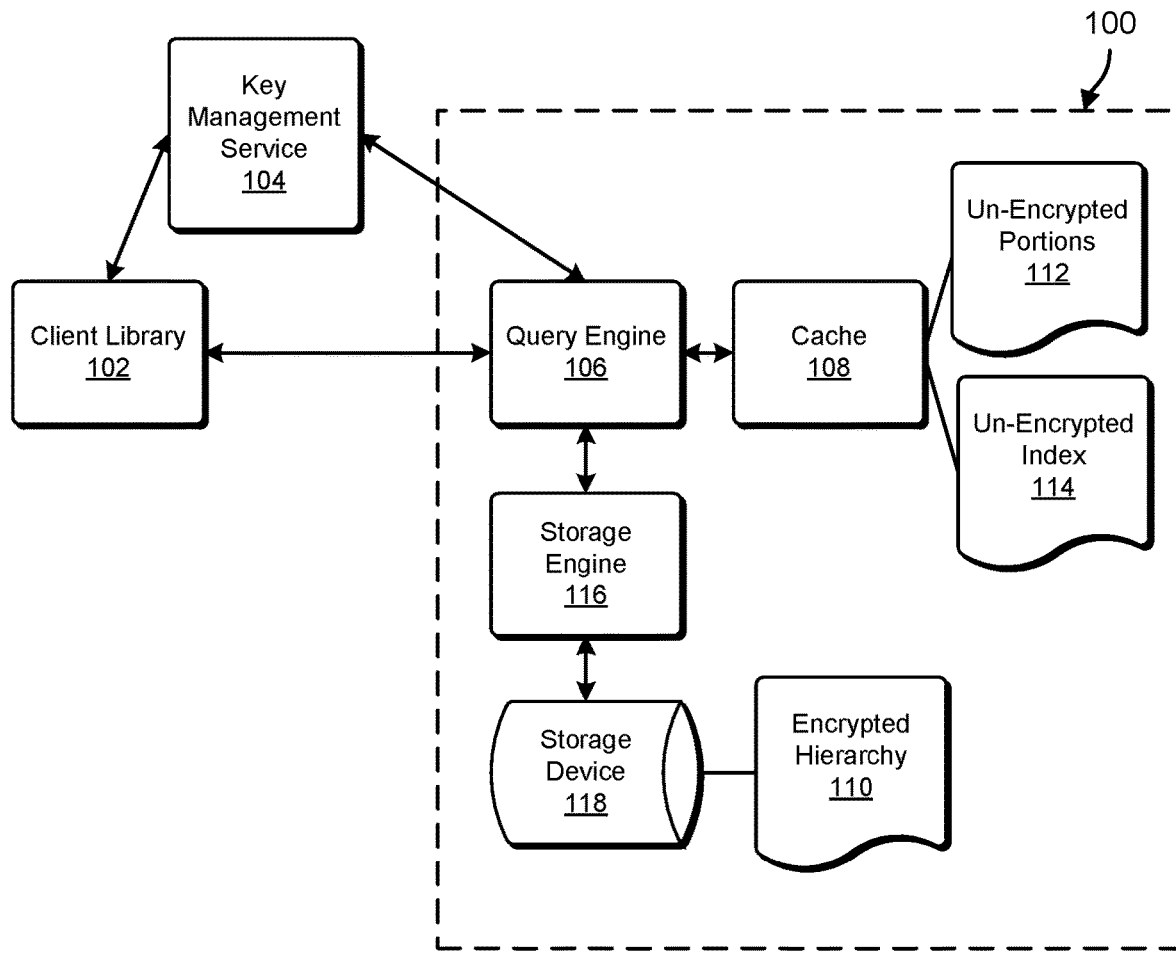
FIG. 1 is a block diagram depicting a data storage and retrieval system, in accordance with an embodiment.

FIG. 1 is a block diagram depicting a data storage and retrieval system, in accordance with an embodiment. In the depicted example data storage and retrieval system 100, a hierarchically encrypted collection of data is stored on a storage device 118. The example data storage and retrieval system 100 may correspond, for example, to a relational database, directory server, object database, and so forth. It will be appreciated that these examples are intended to be illustrative, and as such should not be seen as limiting the scope of the present disclosure to only those embodiments which reflect the specific examples provided.

Examples of collections of data include, but are not necessarily limited to, relational database tables, directories, nested objects, documents, and so forth. These examples may be described as hierarchical collections of data, collections of data, or simply as collections. These examples share a hierarchical aspect, meaning that they may each, in their own respective ways, be seen as a hierarchy. For example, a relational database table typically comprises a collection or rows, where each row is a collection of fields. A directory typically comprises a hierarchical organization of data, such as department, manager, employee, and so on. A document stored in a document repository might comprise sections, paragraphs, and sentences. It will be appreciated that these examples are intended to be illustrative, and as such should not be seen as limiting the scope of the present disclosure to only those embodiments which reflect the specific examples provided.

The example data storage and retrieval system 100 may receive queries of the collection of data from a client library 102. The client library 102 may be a module executing on a computing device, such as the depicted client computing device 702, web server 706, or application servers 708 depicted in FIG. 7.

A module, as used herein, comprises a set of computer-executable instructions, at least some of which are loaded into the memory of a computing system and executed by one or more processors of the computing system. The instructions, in response to being executed by the processors, cause the computing system to perform the operations associated with the module. In various embodiments, the described modules may be combined in various ways as sub-modules, or as modules whose functions overlap with, combine, or duplicate the functions performed by others of the described modules.

Figure 7:
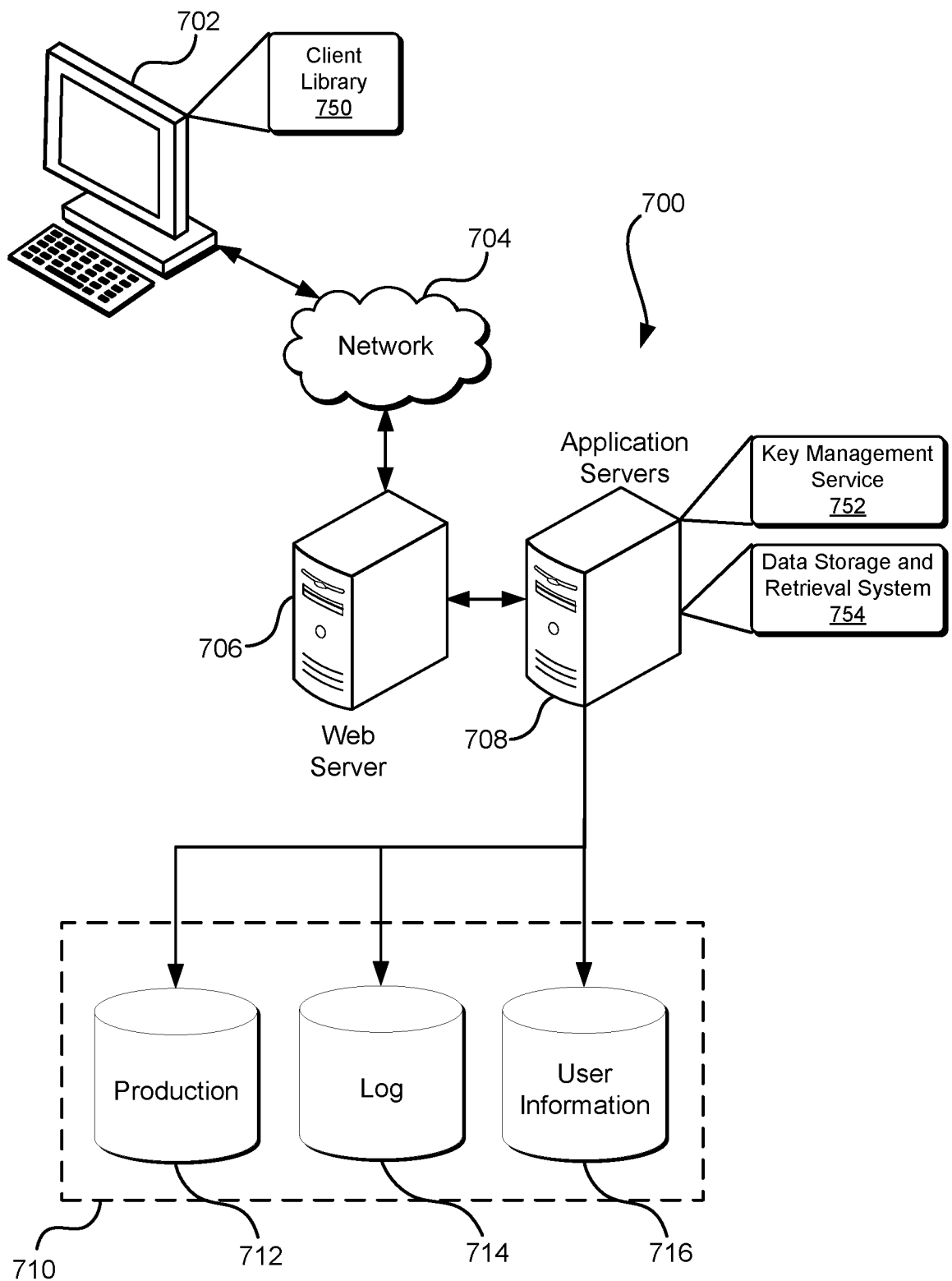
FIG. 7 illustrates a system in which various embodiments can be implemented.

The example data storage and retrieval system 100 comprises a computing device, such as the depicted client computing device 702, web server 706, or application servers 708 depicted in FIG. 7. The computing device is configured to execute the operations of a query engine 106 and storage engine 116. The query engine 106 is a module comprising instructions for performing operations to process queries received from the client library 102. The storage engine 116 is a module comprising instructions for interfacing, on behalf of the query engine 106, with the storage device 118. In general terms, the query engine 106 formulates and executes plans for processing queries, and the storage engine 116 performs related operations which involve the storage or retrieval of data.

The query engine 106 may also interface with a cache 108. The cache 108 may comprise one or more memories in which data from the storage device 118 is temporarily stored. For example, all of or portions of a table stored on the storage device 118 may be read from storage by the storage engine 116, and stored in the cache 108 for subsequent use by the query engine 106. The selection of data to be stored in the cache 108 may, in various embodiments, be determined based on efficiency and performance considerations.

Access to decrypted data stored in the cache is protected, in various embodiments, by verifying that the security principal (on whose behalf the data is being accessed) has access to the cryptographic key(s) needed to access the data. For example, consider a table, row, and field. These may be hierarchically encrypted using three cryptographic keys. If the field is decrypted and stored in the cache, the data storage and retrieval system may decline to access the field unless and until it verifies that the security principal has access to each of the three keys. Since the data is hierarchically encrypted, access to the field requires that the table first be decrypted, then the row, and then finally the field.

In the example data storage and retrieval system 100, a hierarchical collection of data may be stored on the storage device. As noted above, a hierarchical collection of data may include, for example, a relational database, directory, or other data that may be arranged as a hierarchy.

In the example data storage and retrieval system 100, the hierarchical collection of data is stored as an encrypted hierarchy 110. The encrypted hierarchy 110 refers to a hierarchical collection of data in which at least some of the data in the hierarchy is encrypted. In one example, the hierarchical collection of data is a relational database. Elements of the database hierarchy which may be encrypted include, but are not necessarily limited to, tables, rows, columns, and fields. In another example, the hierarchical collection of data is a directory. Examples of the directory hierarchy that may be encrypted include branch or leaf nodes in the directory. In another example, the hierarchical collection of data is a document repository. Examples of the document repository that may be encrypted include documents, sections, and paragraphs. It will be appreciated that these examples are intended to be illustrative, and as such should not be seen as limiting the scope of the present disclosure to only those embodiments which reflect the specific examples provided.

Figure 2:
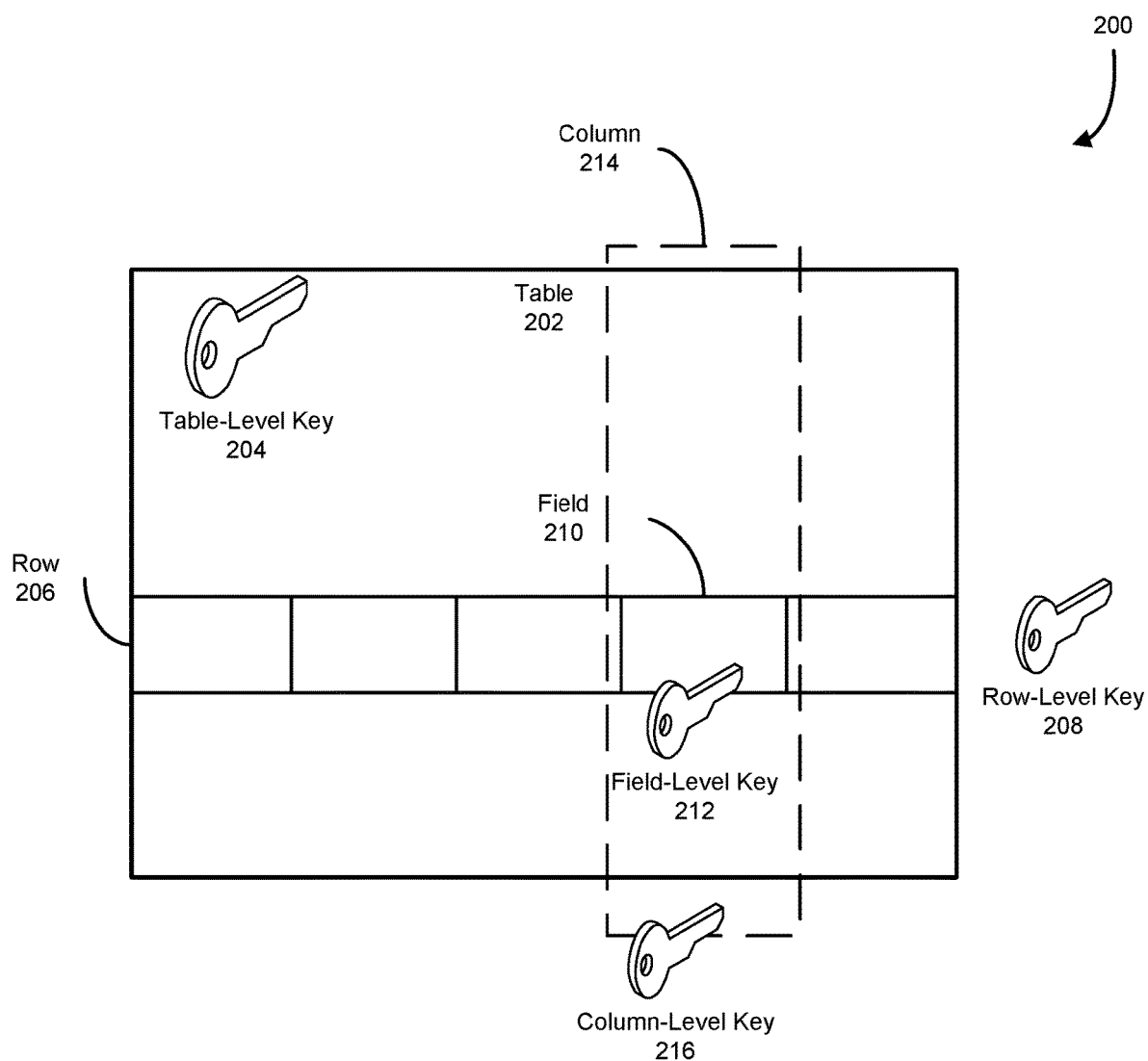
FIG. 2 is a block diagram depicting hierarchical encryption for a relational database table, in accordance with an embodiment.
Figure 3:
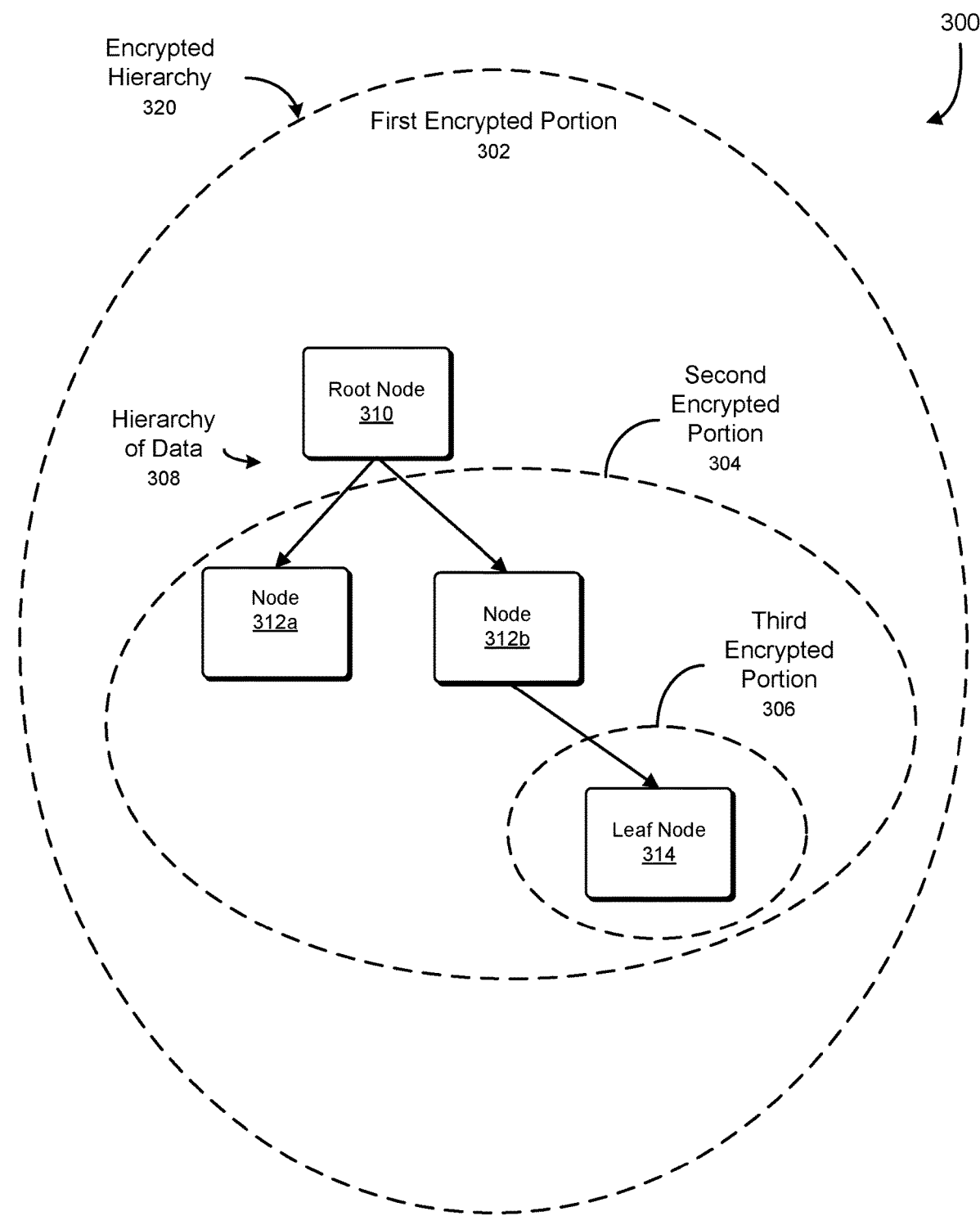
FIG. 3 is a block diagram depicting further aspects of hierarchical encryption, in accordance with an embodiment.

As noted, at least some portions of the encrypted hierarchy 110 are encrypted. Moreover, encryption is hierarchical. For example, a first region of the hierarchy might be encrypted with a first cryptographic key, and might contain a second region that is encrypted with a second cryptographic key. As such, both the first and second cryptographic keys would be needed to decrypt the second region. Further aspects of hierarchical encryption are depicted by FIGS. 2 and 3.

The cryptographic keys needed to decrypt the encrypted portions of the encrypted hierarchy 110 are managed, in the example depicted by FIG. 1, by a key management service 104. The key management service 104 may, in various embodiments, be a web service implemented by a web server 706 and application servers 708, as depicted by FIG. 7. In various embodiments, the key management service may also be a module implemented on a client computing device 1002 or application servers 708. The key management service 104 may be provided as a hosted service, in some instances, or operated at a client site.

In an embodiment, a query received by the query engine 106 comprises information indicative of one or more cryptographic keys used to encrypt portions of the encrypted hierarchy 110. This information, in an embodiment, comprises an identifier of a cryptographic key. In some instances, the identifier is used to retrieve the cryptographic key from the key management service 104. In other instances, the identifier is used by the data storage and retrieval system 100 to retrieve the key from an internal table. The information indicative of an cryptographic key, in another embodiment, is the key itself, possibly represented in the query as a string of alphanumeric characters. In other instances, a link to a binary file is included to identify a key.

In an embodiment, the cryptographic keys are used by the query engine 106 to process the query. For example, the query engine 106 processes queries which may include filtering clauses. As used herein, a filtering clause refers to instructions or other information in a query that are indicative of elements of a collection of data to include in the results of the query. For example, in structured query language ("SQL"), the "WHERE" clause specifies conditions for including or excluding a row in the final result set, and therefore may be described as a filtering clause. It will be appreciate that this example is intended to be illustrative, and as such should not be construed in a manner which would restrict the scope of the present disclosure to only those embodiments conforming to the specific example provided.

The query engine 106, in various embodiments, processes a query which includes a filtering clause by decrypting portions of the encrypted hierarchy 110 referenced by the filtering clause. In an embodiment, the query engine 106 obtains the key information provided in the query to obtain cryptographic key(s) and decrypts the portions of the encrypted hierarchy referenced by the filtering clause.

In an embodiment, portions of the hierarchy are stored in the cache 108 after being decrypted. These cached un-encrypted portions 112 are used in subsequent operations, possibly including operations performed to process subsequently received queries. Access to the un-encrypted portions 112 is based on the security principal's rights to access the keys that would have been needed to decrypt the corresponding encrypted data in the encrypted hierarchy 110.

In an embodiment, confirmation of the security principal's right to access a key is based at least in part on access controls provided by the operating system on which the data storage and retrieval system 100 executes. For example, a file containing the cryptographic key may be restricted to a selected set of security principals. If these include the security principal on whose behalf the query is executing, the file and contained cryptographic key may be accessed.

In an embodiment, confirmation of the security principal's right to access a key is based at least in part on a mapping of security principals to cryptographic keys. The mapping can indicate which keys a security principal is authorized to access, and which keys a security principal is not authorized to access.

In an embodiment, confirmation of the security principal's right to access a key is based at least in part on inclusion of information about the key in the query. For example, possession of the key, or possession of an identifier of the key, may be used as an indication that the security principal is authorized to use the key. This indication may be combined with other forms of confirmation. For example, a query may include an identifier of a key that can be used to retrieve the key from the key management service 104. The query engine 106 can send a request for the key to the key management service 104. The request for the key can include the identifier and information about the security principal. The key management service 104 may then confirm the identity and authorization of the security principal, and provide the key in response to the request.

In an embodiment, an un-encrypted index 114 is generated independently of query execution. For example, the data storage and retrieval system 100 might generate the un-encrypted index 114 in response to a command, from the client library 102, to create the index.

The un-encrypted index 114 may be stored in the cache 108 while the data storage and retrieval system 100 is operative. In some embodiments, the un-encrypted index may be re-encrypted and stored on the storage device. The re-encryption may use keys corresponding to those used to encrypt corresponding portions of the encrypted hierarchy, or with one or more new keys. Access to the index may also be based on the security principal's possession of and authorization to use any keys that would be necessary to access the corresponding data in the encrypted hierarchy.

The query engine 106 may generate results which are partially or fully encrypted. In particular, embodiments may provide results having a hierarchy of encryption corresponding to that of the encrypted hierarchy 110. For example, consider a query of a table of a relational database. In the encrypted hierarchy 110, the table might be encrypted using a first cryptographic key, a row of the table encrypted with a second cryptographic key, and a field of the row encrypted with a third cryptographic key. Assuming, for illustrative purposes, that the results of the query comprise a subset of the rows of the table, the query engine 106 might then generate results data which is encrypted, at the top level, using the first key. Within this encrypted data might be a second portion, corresponding to a row of the table, encrypted using the second key.

And within that portion might be a third portion, corresponding to a field of the row, encrypted using the third key. Note that this data, in this example, is not simply a copy of the encrypted hierarchy 110, since it includes only a subset of the data. It will be appreciate that this example is intended to be illustrative, and as such should not be construed in a manner which would restrict the scope of the present disclosure to only those embodiments conforming to the specific example provided. Further aspects of hierarchical encryption are explained with respect to FIGS. 2-4.

In some embodiments, the encrypted results are provided to the client library 102, which decrypts the encrypted hierarchy of results using the corresponding cryptographic keys. The client library, in an embodiment, obtains the keys from the key management service 104. In other embodiments, the encrypted results are decrypted by the data storage and retrieval system 100 and the decrypted results provided to the client library 102. Here too, the keys may be obtained from the key management service 104 based on information provided in the query, or otherwise received from the client library 102.

In some embodiments, the query engine 106 will generate the results by partially decrypting the encrypted hierarchy 110. For example, if the query pertains to a database table, and the first level of encryption is at the table level, the query engine 106 may decrypt the table, assemble whatever rows are indicated by the query, and then re-encrypt the results using the same key.

FIG. 2 is a block diagram depicting hierarchical encryption for a relational database table, in accordance with an embodiment. A relational database table 202 is one example of a collection of data that may be hierarchically encrypted. It will be appreciate that this example is intended to be illustrative, and as such should not be construed in a manner which would restrict the scope of the present disclosure to only those embodiments conforming to the specific example provided.

A relational database table, as used herein, refers to a collection of data organized by rows and columns. The intersection of each row and column may be referred to as a field. In the example 200 of FIG. 2, the table 202 is a relational database table comprising a collection of rows, including the depicted row 206. As depicted in FIG. 2, the row 206 comprises a number of fields, including the field 210. The field 210 can correspond to a column 214 of the table 202.

In the example 200 of FIG. 2, the table 202 is encrypted with a table-level key 204. Likewise, the row 206 is encrypted with a row-level key 208, and the field 210 with a field-level key 212. In some cases and embodiments, data for the column 214 is encrypted using a column-level key 216, and this data in turn is encapsulated by row-level and/or table-level encryption, using the row-level key 208 and/or table-level key 204.

In an embodiment, a system, such as the data storage and retrieval system 100 depicted in FIG. 1, encrypts the table 202 by first encrypting field 210 using field-level key 212, then encrypting row 206 using row-level key 208, and finally encrypting table 202 using table-level 204. The encryption thus proceeds from the lowest levels of the hierarchy upwards, and the encrypted portions of the lower levels of the hierarchy are included in the encrypted upper levels.

In some cases, groups of fields, columns, rows, or tables can be encrypted using the same key. In one example, a number of fields within a given row are encrypted using the same row-level key. In another example, a group of rows are encrypted using the same row-level key. In another example, a group of tables are encrypted using the same table-level keys. These techniques might be practiced when groups of fields, columns, rows, or tables share common characteristics. For example, a group of fields containing related information might be encrypted using the same field-level key. Likewise, a group of tables related by primary and foreign keys might be encrypted using the same table-level key.

FIG. 3 is a block diagram depicting further aspects of hierarchical encryption, in accordance with an embodiment. In the example 300 of FIG. 3, a hierarchy of data 308 comprises nodes 310-314, arranged as a root node 310 from which other nodes 312a, 312b, and 314 descend.

A system, such as the data storage and retrieval system 100 depicted in FIG. 1, may hierarchically encrypt the depicted hierarchy of data 308. As depicted in the example 300 of FIG. 3, an encrypted hierarchy of data 320 comprises a third encrypted portion 306 that includes a leaf node 314 of the hierarchy of data 308. A second encrypted portion 304 comprises the third encrypted portion 306 and additional nodes 312a,b of the hierarchy of data 308. A first encrypted portion 302 includes the remainder of the hierarchy of data 308, including the root node 310, as well as the second encrypted portion 304. Because this portion includes the second encrypted portion 304, it also includes the third encrypted region 306. Note that, in various embodiments, each encrypted portion 302-306 is encrypted with a different cryptographic key.

To access the root node 310 of the hierarchy of data, the system decrypts the first encrypted portion of the encrypted hierarchy of data 320, using a first cryptographic key.

To access either of the nodes 312a,b in the second encrypted portion 304, the system decrypts the first encrypted portion 302 using a first cryptographic key, and then decrypts the second encrypted portion 304 using a second cryptographic key.

To access the leaf node 314, the system decrypts the first encrypted portion 302 using a first cryptographic key, decrypts the second encrypted portion 304 using a second cryptographic key, and then decrypts the third encrypted portion 306 using a third cryptographic key.

In cases and embodiments, disjoin or continuous regions of a hierarchy of data may be encrypted using the same key. For example, disjoint or continuous nodes of a hierarchy, possibly spanning levels of a hierarchy, may be encrypted using the same key. Thus, within an encrypted hierarchy, there may be some levels of encryption which span multiple levels of a hierarchy of data, which include continuous regions of the hierarchy, or which include disjoin regions of a hierarchy. An encrypted hierarchy, as used herein, contains at least two levels of encryption. These levels of encryption, however, may not in all cases correspond exactly to the levels of the hierarchy.

Figure 4:
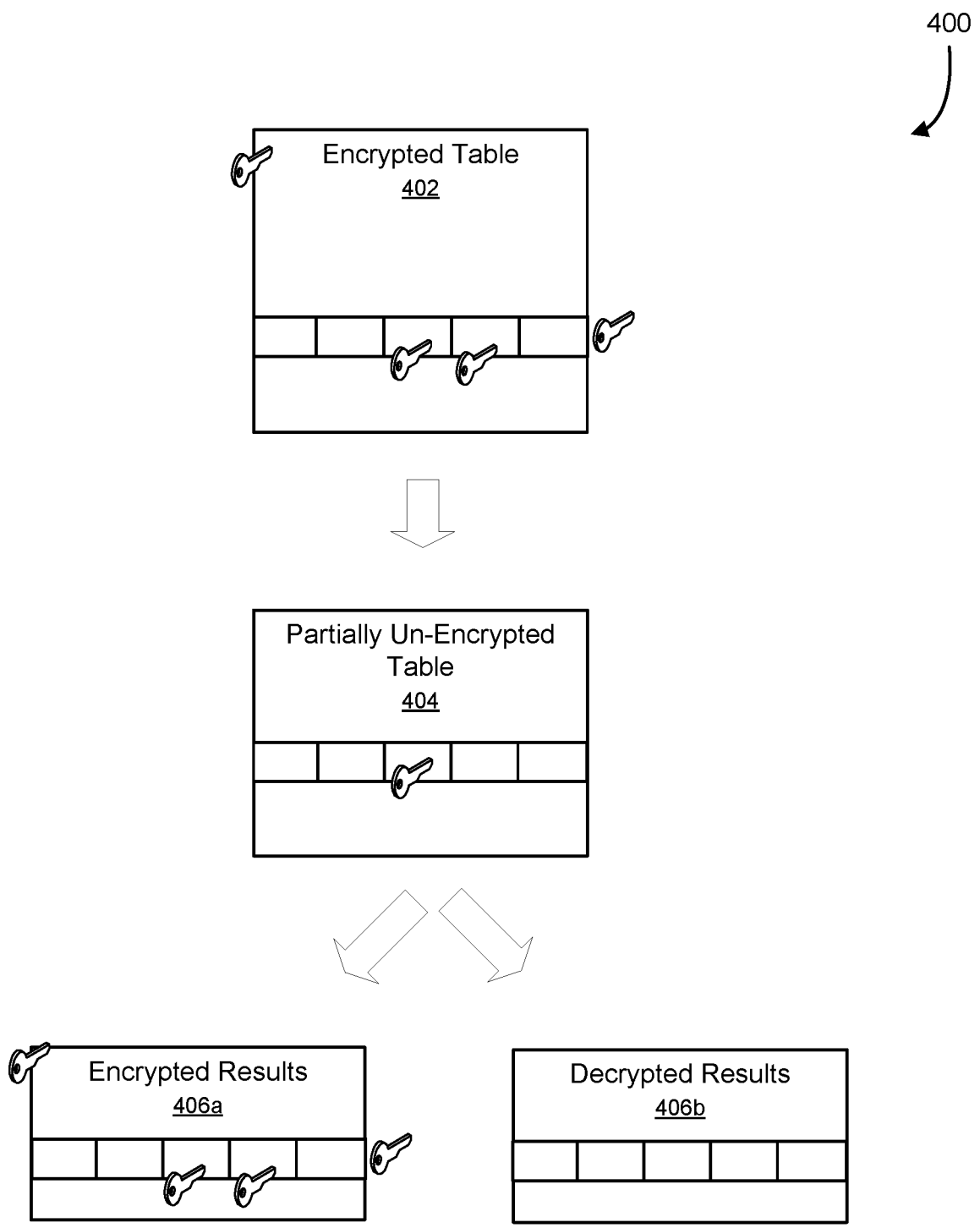
FIG. 4 is a block diagram depicting an example of generating a result set comprising an encrypted hierarchy of data.

FIG. 4 is a block diagram depicting an example of generating a result set comprising an encrypted hierarchy of data. The example 400 of FIG. 4 involves generation of a result set for a query of a relational database table 402 which is stored, on a storage device, as an encrypted hierarchy of data. Although a relational database table is depicted in the example of FIG. 4, it will be appreciate that the depicted example is intended to be illustrative, and as such should not be construed in a manner which would restrict the scope of the present disclosure to only those embodiments conforming to the specific example provided.

In the example 400, a table 402 is stored as an encrypted hierarchy. The table 402 might, in an example, be encrypted at the table level, and certain rows within the table 402 might be separately encrypted, each using a distinct cryptographic key. With each row, certain of the fields might be separately encrypted at the field level.

In the example 400, processing of the query is done using a partially un-encrypted table 404. The partially un-encrypted table 404 may be a copy or subset of table 402 in which at least some portions have been un-encrypted. The un-encrypted portions may be those that were referenced by clauses of the query, such as in a filtering clauses, aggregating clauses, ordering clauses, and so forth. Certain elements, such as fields whose corresponding columns are referenced only in projection clauses, or are not referenced at all, may be left encrypted or excluded from the partially un-encrypted table 404. Rows that have been excluded from the query may also be left out of the partially un-encrypted table 404.

In some cases and embodiments, the partially un-encrypted table 404 may include both encrypted and un-encrypted versions of the same data.

In some cases and embodiments, the results of the query are provided as encrypted results 406a. In other cases and embodiments, the results of the query are provided as decrypted results 406b.

The encrypted results 406a are constructed using both the encrypted table 402 and the partially un-encrypted table 404. The partially un-encrypted table 404 is used to determine what data to include in the encrypted results 406a, e.g., by adding apply filtering, aggregate, and ordering clauses. The encrypted table 402 may be used as a source of encrypted data. In some cases, for example, this data can be copied to the encrypted results, though this may involve decrypting higher levels of the hierarchy in order to access an encrypted lower level.

The encrypted results 406a are provided as an encrypted hierarchy based on the encrypted hierarchy of the original table 402. The encrypted results 406a may then be provided to a client library or other module capable of decrypting the hierarchy.

In some embodiments, the results of the query are provided as decrypted results 406b. These are results in which each requested field is supplied in decrypted form, provided that the security principal has possession and authorization for the corresponding cryptographic keys.

The concepts depicted in FIG. 4 may be applied to other instances, such as when tables are joined, to views, or to other database constructs. Similarly, the concepts depicted in FIG. 4 may be applied to other types of encrypted hierarchies, such as directory data, nested objects, documents, and so forth.

Figure 5:
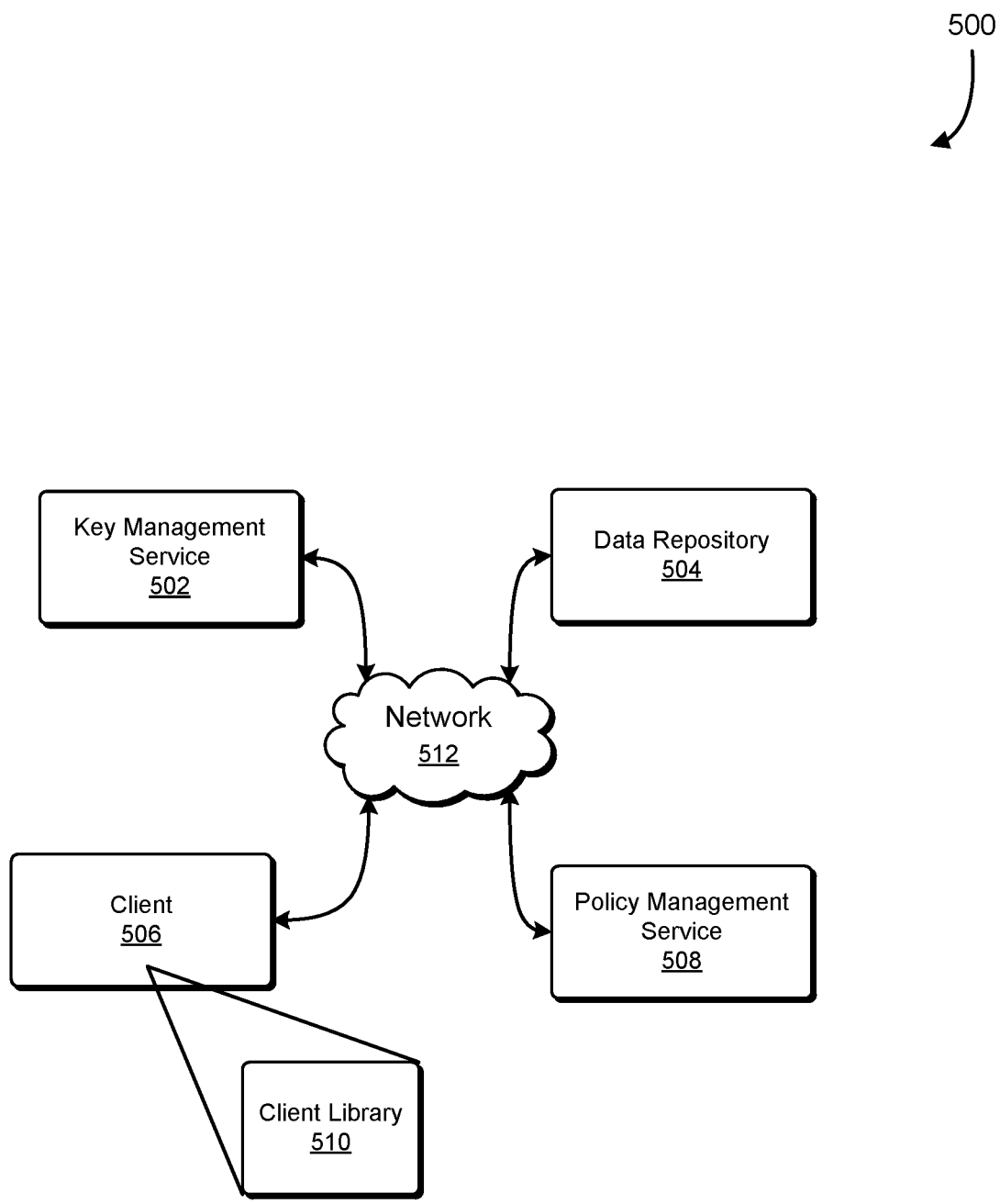
FIG. 5 is a block diagram depicting an example of cryptographic key management.

FIG. 5 is a block diagram depicting an example 500 of cryptographic key management. In the example 500, a client 506 stores and retrieves data from a data repository 504 in which data is stored as a hierarchically encrypted collection of data. The storage and retrieval of this data involves management of the keys used to encrypt the collection. Management of the keys involves creating the keys, tracking association of the keys with elements of the hierarchy, tracking which security principals are authorized to access which keys, and providing the ability to revoke or replace keys.

In an embodiment, cryptographic keys are created when the client 506 requests the creation of a collection of data. Creation of the keys is based, in various embodiments, on the schema of the collection of data that is to be created, and any instructions regarding encryption provided by the request to create the collection. A collection of data may also be encrypted subsequent to creation, using procedures corresponding to those described here.

For example, in an embodiment, a command to create a table will define the schema of the table and indicate whether or not the table is to be encrypted, which rows should be encrypted, and which fields should be encrypted.

In an embodiment, the client 506 uses the client library 510 to send a command to create a collection of data to a data repository 504. The client library 510 identifies which portions of the collection will be encrypted, and uses the key management service 502 to create the appropriate number of keys. The client library 510 forwards the command to create the collection of data to the data repository 504, and provides the appropriate keys.

To retrieve data, the client 506 uses the client library 510 to send a command to retrieve data from the hierarchically encrypted collection of data. This type of command may be referred to as a query. The client 506 can be unaware of the requirement to include cryptographic keys. In an embodiment, the client library 510 re-writes the command so that it includes references to the set of keys needed to perform the query.

In an embodiment, a policy management service 508 tracks information indicating which portions of the collection of data are encrypted, which cryptographic keys are needed to decrypt the encrypted portions, and which security principals are authorized to access which keys.

Alternatively, or in addition, the data repository 504 tracks information indicating which portions of the collection of data are encrypted, which cryptographic keys are needed to decrypt the encrypted portions, and which security principals are authorized to access which keys.

In an embodiment, the policy management service 508 is a module executing on a computing device, such as the application servers 708 depicted in FIG. 7. In some instances, the policy management service 508 is a subcomponent of the data repository 504.

In an embodiment, the key management service 502, the data repository 504, the client 506, and the policy management service 508 are interconnected by a network 512. The network 512 may comprise one or more of the Internet, an intranet, a wireless network, a local area network, and so forth.

Figure 6:
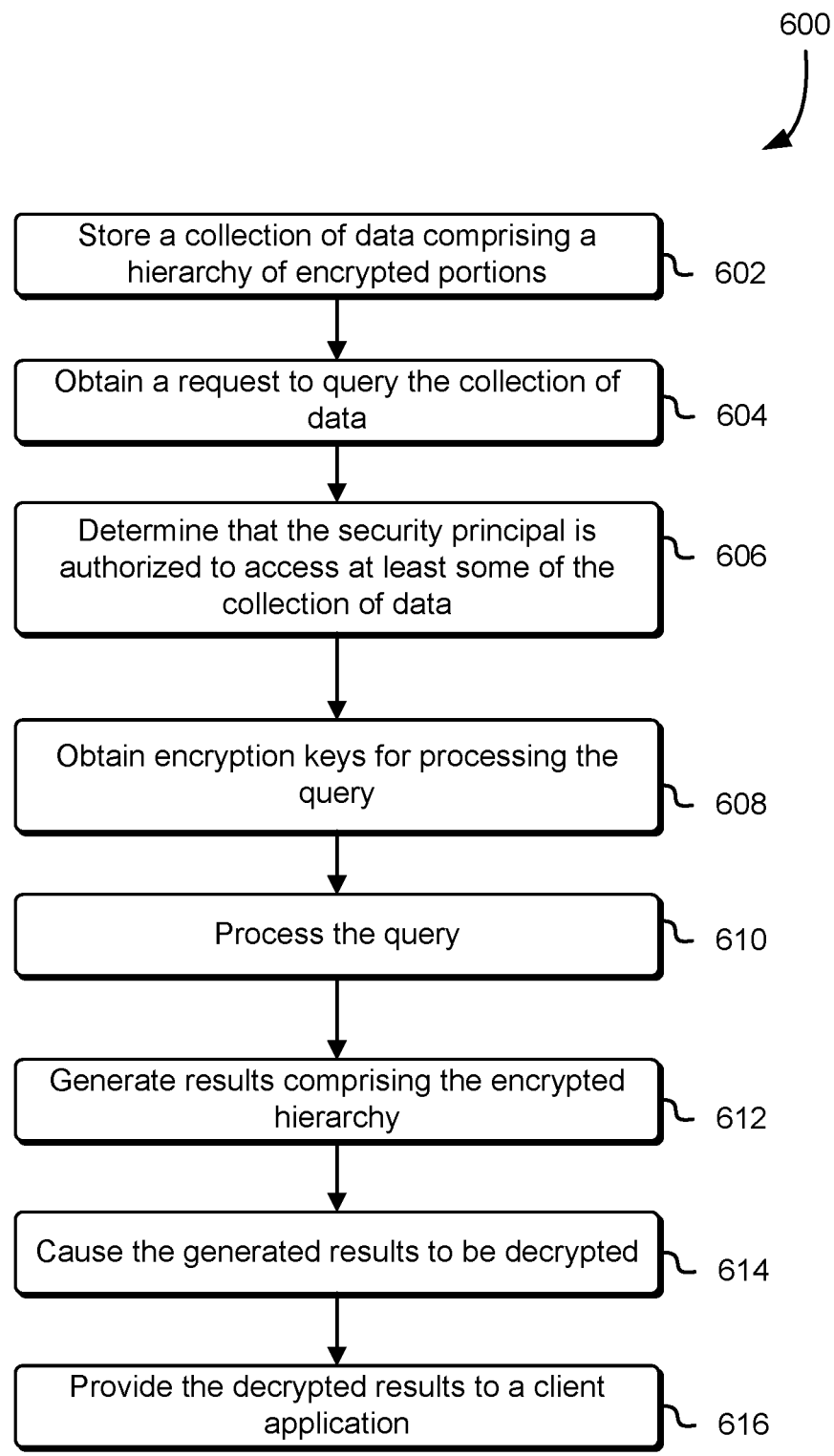
FIG. 6 is a flow diagram depicting an example process for processing a query of a hierarchically encrypted collection of data, in accordance with an embodiment.

FIG. 6 is a flow diagram depicting an example process 600 for processing a query of a hierarchically encrypted collection of data, in accordance with an embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel. The example process 600 may be performed by a data storage and retrieval system, such as the data storage and retrieval system 100 depicted in FIG. 1.

At 602, the data storage and retrieval system stores a collection of data which comprises a hierarchy of encrypted portions. For example, the data storage and retrieval system may store a hierarchy of data, such as the depicted hierarchies of FIG. 2 or 3, on a storage device. The data storage and retrieval system may store the hierarchy such that a first portion is encrypted with a first cryptographic key, and a second portion is encrypted with a second cryptographic key. Moreover, for the purpose of this example it may be presumed that the first portion comprises the second portion, and that the first encrypted portion correspondingly comprises the second encrypted portion.

The data storage and retrieval system is configured to receive a command to create a collection of data, and which further specifies that the collection of data is to be hierarchically encrypted. Continuing the prior example, the data storage and retrieval system may respond to the request by encrypting the second, interior portion using the second cryptographic key, and then encrypting the first portion, comprising the second encrypted portion, using the first cryptographic key.

In an embodiment, the first portion is a row of a database table and the second portion is a column of the row.

In an embodiment, the first portion is an ancestor level of a directory and the second portion is a descendent of the ancestor level.

At 604, the data storage and retrieval system obtains a request to query the collection of data. In some cases, the request is obtained from a client device executing a client library module, such as the client library 102 depicted in FIG. 1. In other cases, the request is generated, retrieved from storage, read from a message queue, read from a buffer, or otherwise obtained by similar operations. The query provides instructions, definitions, or other information indicative of the set of data to retrieve from the hierarchically encrypted collection of data. Further, the query comprises information indicative of the cryptographic keys that are needed to process the query. Note that in some instances, the set of keys needed to process the query may be different than the set of keys needed to fully decrypt the results of processing the query. For example, consider the query "select C1 from T where EC2='abc'." In this example, assume that fields of the column C1 are not encrypted, but that fields of the column EC2 are encrypted. The column EC2 is needed to identify rows to include in the result set, but is not required to present decrypted results, since the results only include column C1. In an embodiment, the query comprises information indicative of cryptographic keys needed to decrypt the results of the query.

At 606, the data storage and retrieval system determines that the security principal is authorized to access at least some of the collection of data. This stage of authorization is based, in various embodiments, on factors such as the identity of the security principal, the membership of the security principal in a group or role, and the security rights associated with the principal, group, or role.

At 608, the data storage and retrieval system obtains cryptographic keys for processing the query. These may, for example, correspond to those keys needed to apply filtering criteria, such as the field "EC2" in the example provided above.

In an embodiment, the data storage and retrieval system stores information mapping between portions of the collection of data and the keys used to encrypt the respective portions. The keys needed to decrypt portions of the hierarchy, or information indicating how those keys may be obtained, may be provided with the query. However, the data storage and retrieval system may also maintain a mapping between portions of the encrypted hierarchy and the corresponding keys for various purposes, such as verifying that a security principal is in possession of a required key.

The data storage and retrieval system can retrieve the keys specified in a query from a key management service. The key management service can confirm the identity of the security principal, and ensure that the security principal is authorized to use the key. If these conditions are met, the key management can return a desired key to the data storage and retrieval system.

The first and second keys can also be provided based at least in part on an access policy associated with the security principal. An access policy refers to rules under which access to a key is granted. For example, an access policy might provide access to a key when the security principal is authorized to access the key and when the key has not been marked as invalid. This approach may allow for access to particular tables, rows, columns, or fields to be quickly and conveniently revoked should circumstances so warrant.

At 610, the data storage and retrieval system processes the query. The processing of the query can involve what may be described as two steps, though it should be noted that these steps are not necessarily performed as distinct or separate operations. The first such step involves identifying data that should be included in the result set. The second such step involves assembling the results according to that determination.

In an embodiment, selection of data to include in the result set is performed using at least some data that has been decrypted and stored in a cache maintained by the data storage and retrieval system. For example, in an embodiment, the data storage and retrieval system processes a filter operation associated with the query, by referencing decrypted portions of the hierarchy of data. For example, the query might be processed by successively decrypting levels of a hierarchy of data, and maintaining a copy of the decrypted hierarchy in a cache. Note that access to the cache is protected, such that it cannot be easily accessed except by components of the data storage and retrieval system. Moreover, the data storage and retrieval system may restrict access to the unencrypted data based on the authorizations of the security principal and the provision of corresponding cryptographic keys in the query.

In an embodiment, the data storage and retrieval system maintains an index comprising an unencrypted copy of the second portion of the collection of data. The index may function similarly to the cache, but may be pre-constructed in order to improve efficiency.

At 612, the data storage and retrieval system generates results which comprise portions of the encrypted hierarchy. This step may involve copying the data to be included in the result set to a buffer or other memory that can be accessed by or sent to the client. In some cases and embodiments, data is copied to the buffer while still encrypted, so that the encryption hierarchy of the results corresponds to the encryption hierarchy of the original data. For example, the structure of the encrypted hierarchy may be maintained in the encrypted results, even if all of the data originally in the encrypted hierarchy is not included in the encrypted results. Data filtered out by a "WHERE" clause in a query, for example, would be excluded, but the levels of encryption in the encrypted results would be based on the same pattern used in the encrypted hierarchy. In other cases and embodiments, some data is copied while still encrypted, and some is copied after being decrypted. For example, in a query of a table, selected rows or fields might be stored in the buffer as encrypted data, and other rows or fields might be stored as unencrypted data.

In an embodiment, decrypted data that has been cached or stored in an index is copied to the buffer. This is done after confirming that the cryptographic keys indicated by the query correspond to the cryptographic keys that were used to decrypt the data. Thus, in an embodiment, the system provides data that has been unencrypted only when it can be confirmed that the security principal has authorized access to whatever keys would have been needed to decrypt the data, had that data not already been decrypted.

At 614, the data storage and retrieval system causes the generated results to be decrypted. In some embodiments, a module within the data storage and retrieval system, such as the query engine 106 depicted in FIG. 1, obtains whatever keys are needed to decrypt the results, performs the decryption, and provides the decrypted results to the client. The results may, in some instances, be provided via a client library, such as the client library 102 depicted in FIG. 1.

The data storage and retrieval system thus causes the decryption to be performed by activating or invoking the functions of the module that perform the decryption. In other embodiments, the data storage and retrieval system provides the results, while still encrypted, to a client library for decryption on the client.

At 616, the decrypted results are provided to a client application. In some cases and embodiments, the decrypted results may be sent from the data storage and retrieval system to the client application directly, or through a client library. In other cases and embodiments, the client library decrypts the results and then provides them to the client library.

In an embodiment, a system comprises at least one processor; and at least one memory having stored thereon instructions that, in response to being executed by the at least one processor, cause the system to at least: store a collection of data comprising a first portion encrypted with a first key, and a second portion encrypted with a second key, wherein the first encrypted portion comprises the second encrypted portion; receive a request to query a collection of data on behalf of a security principal, wherein the query comprises information indicative of the first and second keys; generate results of the query based at least in part on a determination that the security principal is authorized to access at least some of the collection of data, wherein the generated results comprise the encrypted first and second portions of the collection of data; and cause the encrypted first and second portions in the results to be decrypted using the first and second keys.

In an embodiment, a computer-implemented method comprises receiving a request to query a collection of data, the collection of data comprising a first portion encrypted with a first key, and a second portion encrypted with a second key, wherein the first encrypted portion comprises the second encrypted portion, wherein the query comprises information indicative of the first and second keys; generating first results of the query based at least in part on a determination that the security principal is authorized to access at least some of the collection of data, wherein the first results comprise the encrypted first and second portions of the collection of data; and generating second results of the query by causing the encrypted first and second portions of the collection of data to be decrypted based at least in part on the first and second keys.

In another embodiment, a non-transitory computer-readable storage medium having stored thereon executable instructions that, as a result of being executed by one or more processors of a computer system, cause the computer system to at least: receive a request to query a collection of data on behalf of a security principal, wherein the query comprises information indicative of the first and second keys, wherein the collection of data comprises a first portion encrypted with a first key, and a second portion encrypted with a second key, wherein the first encrypted portion comprises the second encrypted portion; generate results of the query based at least in part on a determination that the security principal is authorized to access at least some of the collection of data, wherein the generated results comprise the encrypted first and second portions of the collection of data; and cause the encrypted first and second portions in the results to be decrypted using the first and second keys. In another embodiment, a method comprises obtaining a request to query a collection of data on behalf of a security principal. The request is obtained, for example, by receiving a transmitted query or by a module generating the query. The collection of data comprises an encrypted hierarchy in which a first portion of the encrypted hierarchy is encrypted with a first key, and in which the first portion contains a second portion encrypted with a second key. The first key and the second key are not interchangeable. Information about the keys are provided in the query, which may for example comprise a copy of the keys, identifiers of the keys, or other information indicative of the keys. The method further comprises generating intermediate results of the query based at least in part on a determination that the security principal is authorized to query the collection of data. The intermediate results of the query comprise at least a subset of the encrypted hierarchy whose structure corresponds to that of the encrypted hierarchy. For example, the subset comprises the encrypted first and second portions and the encrypted first portion contains the encrypted second portion. The method further comprises generating results of the query based on the intermediate results, by causing the encrypted first and second portions of the collection of data to be decrypted based at least in part on the first and second keys.

As one skilled in the art will appreciate in light of this disclosure, certain embodiments may be capable of achieving certain advantages, including some or all of the following. First, the described techniques permit fine-grained control over which portions of a collection can be accessed by any one user or entity. Second, in the event of a data breach, the amount of data that can be accessed by a malicious user is limited. Third, the efficiency of the database is maintained even though the data is encrypted. Forth, convenient rotation or invalidation of keys is enabled.

FIG. 7 illustrates aspects of an example system 700 for implementing aspects in accordance with an embodiment. In the example system 700, a client computing device 702 comprises and performs the functions of a client library 750. The client library 750 can correspond to the client library 102 of FIG. 1. The example system 700 may further comprise application servers 708 which comprise and perform at least some of the functions of a key management service 752 and a data storage and retrieval system 754. These may correspond to the key management service 104 and data storage and retrieval system 100 of FIG. 1. As will be appreciated, although a web-based system is used for purposes of explanation, different systems may be used, as appropriate, to implement various embodiments. In an embodiment, the system includes a client computing device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one of the application servers 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client computing device 702 and the application servers 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application servers 708 and obtain, update or otherwise process data in response thereto and the application servers 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client computing device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the example system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The example system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the example system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory having stored thereon instructions that, in response to being executed by the at least one processor, cause the system to at least:
      store a collection of data comprising a first portion encrypted with a first key and a second portion encrypted with a second key, wherein the first encrypted portion contains the second encrypted portion;
      receive a request to query the collection of data on behalf of a security principal, wherein the query comprises information indicative of the first and second keys;
      generate intermediate results of the query based at least in part on a determination that the security principal is authorized to access at least some of the collection of data, wherein the intermediate results of the query comprise the encrypted first and second portions of the collection of data and the first encrypted portion contains the second encrypted portion; and
      cause the encrypted first and second portions of the intermediate results to be decrypted using the first and second keys.

2. The system of claim 1, wherein the collection of data comprises a first encrypted hierarchy and the intermediate results comprise a second encrypted hierarchy whose structure corresponds to that of the first encrypted hierarchy.

3. The system of claim 1, wherein the first portion is a row of a database table and the second portion is a column of the row.

4. The system of claim 1, the at least one memory having stored thereon instructions that, in response to being executed by the at least one processor, cause the system to at least process a filter operation associated with the query, the processing based at least in part on the decrypted first and second portions of the collection of data, wherein the decrypted first and second portions of the collection of data are held in a protected cache.

5. The system of claim 1, the at least one memory having stored thereon instructions that, in response to being executed by the at least one processor, cause the system to at least:
   store, in a cache, the decrypted first and second portions of the collection of data; and
   generate the intermediate results based at least in part on the stored decrypted first and second portions, based at least in part on confirming that the information indicative of the first and second keys corresponds to cryptographic keys used to decrypt the first and second portions.

6. A computer-implemented method, comprising:
   obtaining a request to query a collection of data on behalf of a security principal, the collection of data comprising an encrypted hierarchy in which a first portion of the encrypted hierarchy is encrypted with a first key, and in which the first portion contains a second portion encrypted with a second key, wherein the query comprises information indicative of the first and second keys;

generating first results of the query based at least in part on a determination that the security principal is authorized to query the collection of data, wherein the first results of the query comprise at least a subset of the encrypted hierarchy, the subset comprising the encrypted first and second portions; and generating second results of the query by causing the encrypted first and second portions of the collection of data to be decrypted based at least in part on the first and second keys.

7. The method of claim 6, wherein the subset of the encrypted hierarchy has a structure corresponding to that of the encrypted hierarchy.

8. The method of claim 6, wherein the first and second keys are retrieved from a key management service, based at least in part on the information indicative of the first and second keys.

9. The method of claim 6, wherein the collection of data is stored in a relational database, and wherein a plurality of keys are mapped to a plurality of elements of a schema of the relational database.

10. The method of claim 6, wherein the first results are generated based at least in part on decrypted first and second portions stored in a cache.

11. The method of claim 6, further comprising:
obtaining a command to create a hierarchically encrypted collection of data using hierarchical encryption.

12. The method of claim 6, wherein the determination that the security principal is authorized to query the collection of data is based, at least in part, on determining that the security principal is authorized to use the first and second keys.

13. The method of claim 6, further comprising:
storing information mapping between portions of the collection of data and the keys used to encrypt the respective portions.

14. A non-transitory computer-readable storage medium having stored thereon executable instructions that, as a result of being executed by one or more processors of a computer system, cause the computer system to at least:
obtain a request to query a collection of data on behalf of a security principal, wherein the query comprises information indicative of a first key and a second key, wherein the collection of data comprises a first portion encrypted with the first key, wherein the first portion includes a second portion encrypted with the second key;

generate intermediate results of the query based at least in part on a determination that the security principal is authorized to access at least some of the collection of data, wherein the intermediate results of the query comprise the encrypted first and second portions of the collection of data; and cause the encrypted first and second portions in the intermediate results to be decrypted using the first and second keys.

15. The non-transitory computer-readable storage medium of claim 14, wherein the instructions further comprise instructions that, as a result of being executed by the one or more processors, cause the computer system to retrieve the first and second keys from a key management service, based at least in part on the information indicative of the first and second keys.

16. The non-transitory computer-readable storage medium of claim 14, wherein the instructions further comprise instructions that, as a result of being executed by the one or more processors, cause the computer system to:
decrypt the first and second portions of the collection of data using the first and second keys; and
store the decrypted first and second portions of the collection of data in a cache.

17. The non-transitory computer-readable storage medium of claim 16, wherein the instructions further comprise instructions that, as a result of being executed by the one or more processors, cause the computer system to perform a filtering operation based at least in part on the cached decrypted first and second portions.

18. The non-transitory computer-readable storage medium of claim 14, wherein the instructions further comprise instructions that, as a result of being executed by the one or more processors, cause the computer system to maintain an index comprising an unencrypted copy of the second portion of the collection of data.

19. The non-transitory computer-readable storage medium of claim 14, wherein the intermediate results of the query are generated based, at least in part, on determining that the security principal is authorized to use the first and second key.

20. The non-transitory computer-readable storage medium of claim 14, wherein the intermediate results of the query are generated based at least in part on an additional portion of the collection of data decrypted using an additional key, the additional portion not included in the intermediate results.

* * * * *